United States Patent [19]
Lee et al.

[11] Patent Number: 6,163,415
[45] Date of Patent: Dec. 19, 2000

[54] LOADING AND UNLOADING A FLYING LENS

[75] Inventors: Yu-Chuan Lee, Cupertino; Gregory H. Chao, San Jose, both of Calif.

[73] Assignee: Siros Technologies, Inc., San Jose, Calif.

[21] Appl. No.: 09/285,401

[22] Filed: Apr. 2, 1999

[51] Int. Cl.[7] .................................................. G02B 7/02
[52] U.S. Cl. ........................... 359/813; 359/637; 369/53; 369/44.15; 369/44.23; 360/75; 360/105; 360/133
[58] Field of Search ..................... 359/811, 813, 359/819, 637; 369/13, 44.15, 44.23, 53, 94; 360/71, 75, 104, 105, 133

[56] References Cited

U.S. PATENT DOCUMENTS

| | | | |
|---|---|---|---|
| H1425 | 4/1995 | Wolter | 360/104 |
| 4,393,425 | 7/1983 | Wright | 360/105 |
| 4,612,437 | 9/1986 | Ohsato | 250/201 |
| 4,620,251 | 10/1986 | Gitzendanner | 360/103 |
| 4,663,682 | 5/1987 | McNeil | 360/105 |
| 5,012,369 | 4/1991 | Owe et al. | 360/104 |
| 5,027,241 | 6/1991 | Hatch et al. | 360/105 |
| 5,086,360 | 2/1992 | Smith et al. | 360/103 |
| 5,105,408 | 4/1992 | Lee et al. | 369/44.15 |
| 5,202,875 | 4/1993 | Rosen et al. | 369/94 |
| 5,237,472 | 8/1993 | Morehouse et al. | 360/105 |
| 5,268,882 | 12/1993 | Mukawa | 369/13 |
| 5,282,190 | 1/1994 | Maruo et al. | 369/115 |
| 5,289,325 | 2/1994 | Morehouse et al. | 360/105 |
| 5,291,359 | 3/1994 | Wolter | 360/104 |
| 5,313,445 | 5/1994 | Wada et al. | 369/53 |
| 5,455,723 | 10/1995 | Boutaghou et al. | 360/75 |
| 5,469,314 | 11/1995 | Morehouse et al. | 360/105 |
| 5,483,504 | 1/1996 | Horita et al. | 369/13 |
| 5,486,964 | 1/1996 | Morehouse et al. | 360/105 |
| 5,497,359 | 3/1996 | Mamin et al. | 369/44.15 |
| 5,508,857 | 4/1996 | Horita | 360/75 |
| 5,530,607 | 6/1996 | Spendlove | 360/105 |
| 5,535,074 | 7/1996 | Leung | 360/104 |
| 5,574,604 | 11/1996 | Berg et al. | 360/105 |
| 5,579,189 | 11/1996 | Morehouse et al. | 360/105 |

(List continued on next page.)

FOREIGN PATENT DOCUMENTS

| | | | |
|---|---|---|---|
| 0 727 777 | 8/1996 | European Pat. Off. | G11B 7/12 |
| 8-315404 | 11/1996 | Japan | G11B 7/135 |
| 96/12272 | 4/1996 | WIPO | G11B 5/54 |

(List continued on next page.)

OTHER PUBLICATIONS

Ichimura et al., "High–Density Optical Recording Using a Solid Immersion Lens", Jul. 1, 1997, Applied Optics, vol. 36, No. 19, pp. 4339–4348.

Kaneko et al., "Magneto–Optical Recording on Pt/Co and GdFeCoTbFeCo Disks Using a Green Laser". 1993, IEEE Transactions on Magnetics, vol. 29, No. 6, pp. 3766–3771.

"Near–Field Optical Storage", Nov. 1997, Optics & Photonics News, pp. 38–39.

Osato et al., "A Rewritable Optical Disk System with Over 10 GB of Capacity", 1998, Optical Data Storage, Tech. Dig. Ser., vol. 8, May 10–13, 1997 Conference Edition.

Yamaguchi, et al. "New Flying Optical Head for High Speed Accessing", 1990, SPIE vol. 1248, Storage and Retrieval Systems and Applications, pp. 96–103.

*Primary Examiner*—Loha Ben
*Attorney, Agent, or Firm*—Sierra Patent Group, Ltd.

[57] ABSTRACT

An apparatus and a method for loading and unloading a flying lens relative to the surface of an optical storage media is provided. The apparatus is comprises a flying lens, a movable optical module for supporting and positioning the lens, and a ramp that slidably engages the movable optical module to load and unload the flying lens. The flying lens is loaded, or moved into a position close to the surface of the moving optical storage media, when the speed is sufficient that aerodynamic forces prevent contact between the flying lens and the storage media. The flying lens is unloaded before the storage media slows or stops and is held in a parked position by the ramp. During the loading and unloading the alignment integrity of the optical path is maintained.

61 Claims, 7 Drawing Sheets

U.S. PATENT DOCUMENTS

| | | | |
|---|---|---|---|
| 5,585,980 | 12/1996 | Boutaghou | 360/105 |
| 5,590,095 | 12/1996 | Chaya | 369/13 |
| 5,610,901 | 3/1997 | Best et al. | 369/275.1 |
| 5,619,371 | 4/1997 | Pontius | 359/368 |
| 5,636,085 | 6/1997 | Jones et al. | 360/103 |
| 5,638,241 | 6/1997 | Sonderegger | 360/133 |
| 5,703,862 | 12/1997 | Lee et al. | 369/112 |
| 5,706,080 | 1/1998 | Pekin et al. | 356/72 |
| 5,712,842 | 1/1998 | Yamamoto et al. | 369/112 |
| 5,719,720 | 2/1998 | Lee | 360/71 |
| 5,726,832 | 3/1998 | Inagaki et al. | 360/105 |
| 5,729,522 | 3/1998 | Akama et al. | 369/112 |
| 5,742,454 | 4/1998 | Vera et al. | 360/105 |
| 5,745,325 | 4/1998 | Matsumoto | 360/105 |
| 5,754,371 | 5/1998 | Meyer et al. | 360/105 |
| 5,757,573 | 5/1998 | Tokuyama et al. | 360/75 |
| 5,757,742 | 5/1998 | Akiba et al. | 369/44.23 |
| 5,764,437 | 6/1998 | Meyer et al. | 360/105 |
| 5,764,613 | 6/1998 | Yamamoto et al. | 369/112 |
| 5,768,059 | 6/1998 | Bishop et al. | 360/105 |
| 5,768,241 | 6/1998 | Kanazawa et al. | 369/77.2 |
| 5,777,970 | 7/1998 | Kajiyama et al. | 369/94 |
| 5,786,968 | 7/1998 | Osaka | 360/104 |
| 5,796,557 | 8/1998 | Bagnell et al. | 360/105 |
| 5,798,988 | 8/1998 | Koyama | 369/44.14 |
| 5,808,837 | 9/1998 | Norton | 360/105 |
| 5,809,000 | 9/1998 | Choi | 369/112 |
| 5,828,512 | 10/1998 | Wada et al. | 360/75 |
| 5,831,786 | 11/1998 | Boutaghou et al. | 360/75 |
| 5,831,795 | 11/1998 | Ma et al. | 360/105 |
| 5,844,754 | 12/1998 | Stefansky et al. | 360/106 |
| 5,852,532 | 12/1998 | Summers | 360/104 |
| 5,862,018 | 1/1999 | Vera et al. | 360/105 |
| 5,862,019 | 6/1999 | Larson | 360/106 |
| 5,864,445 | 1/1999 | Bennin et al. | 360/104 |
| 5,864,448 | 1/1999 | Berberich | 360/105 |
| 5,870,250 | 2/1999 | Bolasna et al. | 360/103 |
| 5,870,255 | 2/1999 | Hornung et al. | 360/105 |
| 5,870,259 | 2/1999 | Alt et al. | 360/105 |

FOREIGN PATENT DOCUMENTS

| | | | |
|---|---|---|---|
| 96/12273 | 4/1996 | WIPO | G11B 5/54 |
| 96/27873 | 9/1996 | WIPO | G11B 5/127 |
| 96/36045 | 11/1996 | WIPO | G11B 5/54 |
| 96/39696 | 12/1996 | WIPO | G11B 23/03 |
| 97/07507 | 2/1997 | WIPO | G11B 21/12 |
| 98/09285 | 3/1998 | WIPO | G11B 11/10 |

LOADING AND UNLOADING A FLYING LENS

This application is related to Application Ser. No. 09/109,111 filed Jul. 2, 1998, now U.S. Pat. No. 6,064,529.

BACKGROUND OF THE INVENTION

1. Field of the Invention

The present invention relates to optical focusing, and more particularly to loading and unloading a flying lens used for optical data storage.

2. Background of the Invention

The use of optical data storage disks is known in the art. Examples include compact disks (CDs), magneto-optical disks (M/O), and digital video disks (DVD). Recently it has been proposed that systems using multiple lenses, including a "flying lens," be used to increase the storage capacity of the optical data storage disks. Such flying lenses are maintained at a nearly fixed distance from the surface of the rotating disks by aerodynamic effects.

The use of flying heads for use with magnetic data storage disks is known in the art, although they differ somewhat from flying lenses. A flying lens is a lens in an optical system and it may cooperate with one or more other lenses, such as a moveable objective lens. A flying lens optical system can be used with both fixed and removable storage media. All lenses in the optical system must maintain alignment with each other and a light source. This alignment requirement is absent in flying heads used for magnetic data storage systems. In addition, a flying lens assembly is typically larger in size than a flying head.

Many known prior art optical storage systems do not use a flying lens and thus do not require rotation of a disk, and the associated aerodynamic effects, to keep lenses separated from the surface of the storage media. The lens position in these systems is away from the surface of the optical storage media. These prior art systems do not require "unloading" the lens from the surface of the storage media before stopping disk rotation. Flying lens optical systems have been proposed and discussed in the literature. Such filing len systems do require a method or apparatus for loading and/or unloading these flying lenses.

Known prior art magnetic data storage systems which use flying heads often require such unloading. However, the heads are much smaller and there is no need to maintain the critical optical alignments as with components of optical data storage systems.

A technique known in the art and sometimes used with flying head magnetic systems is to "park" the head against the surface of the storage media. This parking may be done on a rough surface to minimize adhesion between the parked head and the magnetic disk surface. The surfaces of optical data storage disks however typically lack such rough surfaces and the larger physical size of a flying lens assembly increases the adhesion. These traits increase the likelihood of damage to flying lens optical systems which park the flying lens on the disk surface compared to flying head magnetic systems.

Accordingly, it would be desirable to provide a system to load and unload a flying lens used with optical data storage disks.

SUMMARY OF THE INVENTION

An apparatus and a method for loading and unloading a flying lens relative to the surface of an optical storage media is provided. The apparatus comprises a flying lens, a movable optical module for supporting and positioning the lens, and a ramp that slidably engages the movable optical module to load and unload the flying lens. The flying lens is loaded, or moved into a position close to the surface of the moving optical storage media, when the speed is sufficient that aerodynamic forces prevent contact between the flying lens and the storage media. The flying lens is unloaded before the storage media slows or stops and is held in a parked position by the ramp. During the loading and unloading the alignment integrity of the optical path is maintained.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons after an examination of the within disclosure.

The present invention provides an apparatus and a method for loading and unloading a flying lens, used for storing and accessing data in optical storage media. This disclosure will use the terms "accessing" and "data" to refer to either storing or retrieving information in any format of optical storage media including, but not limited to, rotating disks such as compact disks (CDs) and magneto-optical disks (M/O), flexible endless belts, tapes and such other optical storage media as would be known to those of skill in the art.

The present invention may be used to load and unload a flying lens used alone or in conjunction with objective lens, although the present invention is not intended to be limited any particular application that uses multiple lenses. In a presently preferred embodiment of the present invention, a flying lens and a movable objective lens work cooperatively to correct spherical aberrations. The flying lens and the movable objective lens are preferably attached to a movable optical module. The loading and unloading process is done so that it does not interfere with the optical path and the relative alignment of the lenses. That is, the loading and unloading process does not substantially affect the object lens or optical module. In addition, when the flying lens is unloaded, a gap between it and the objective lens is maintained in order to avoid damage to one or both lenses.

Figure 1:
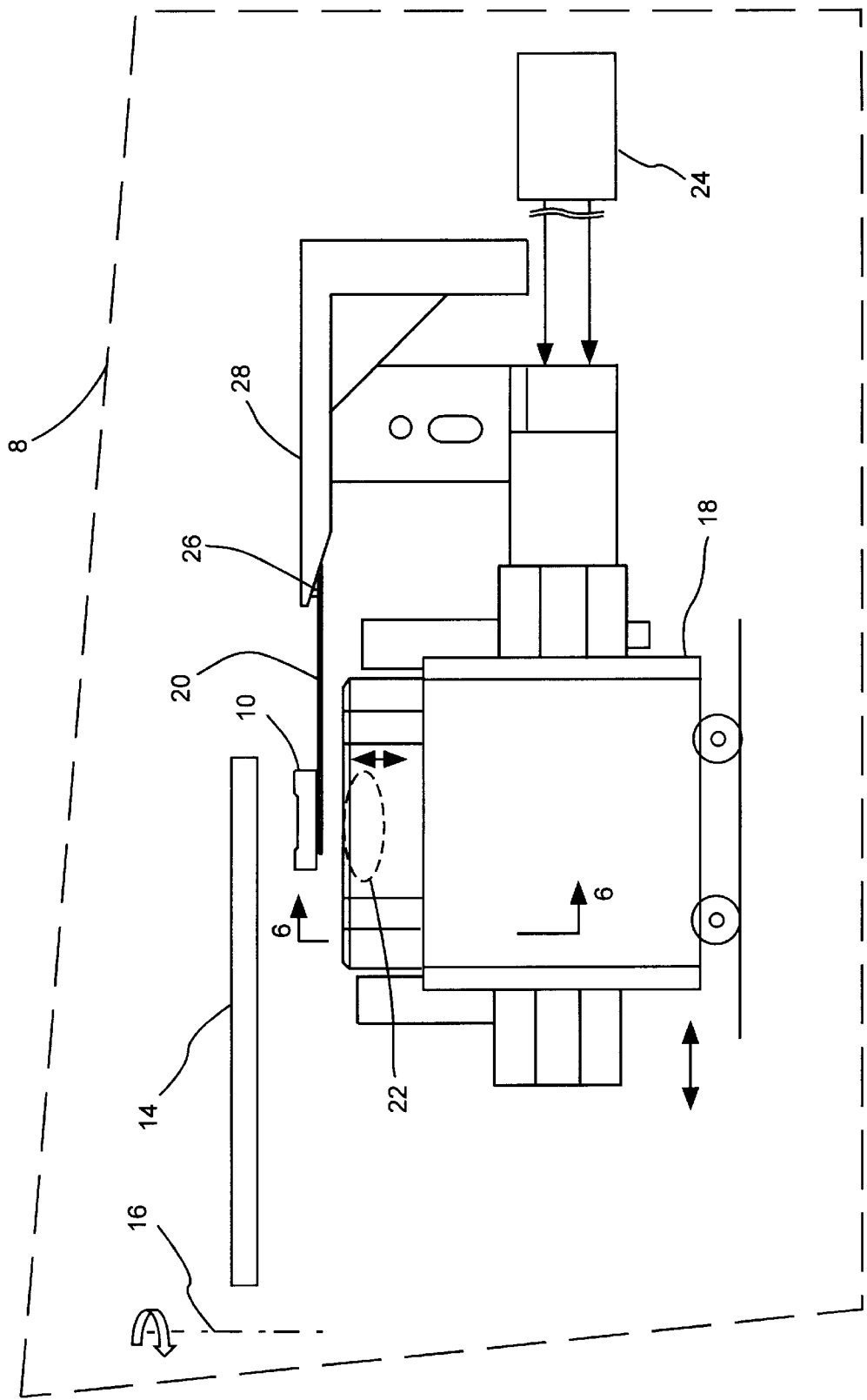
FIG. 1 is an elevation view of a partially loaded flying lens system.
Figure 2:
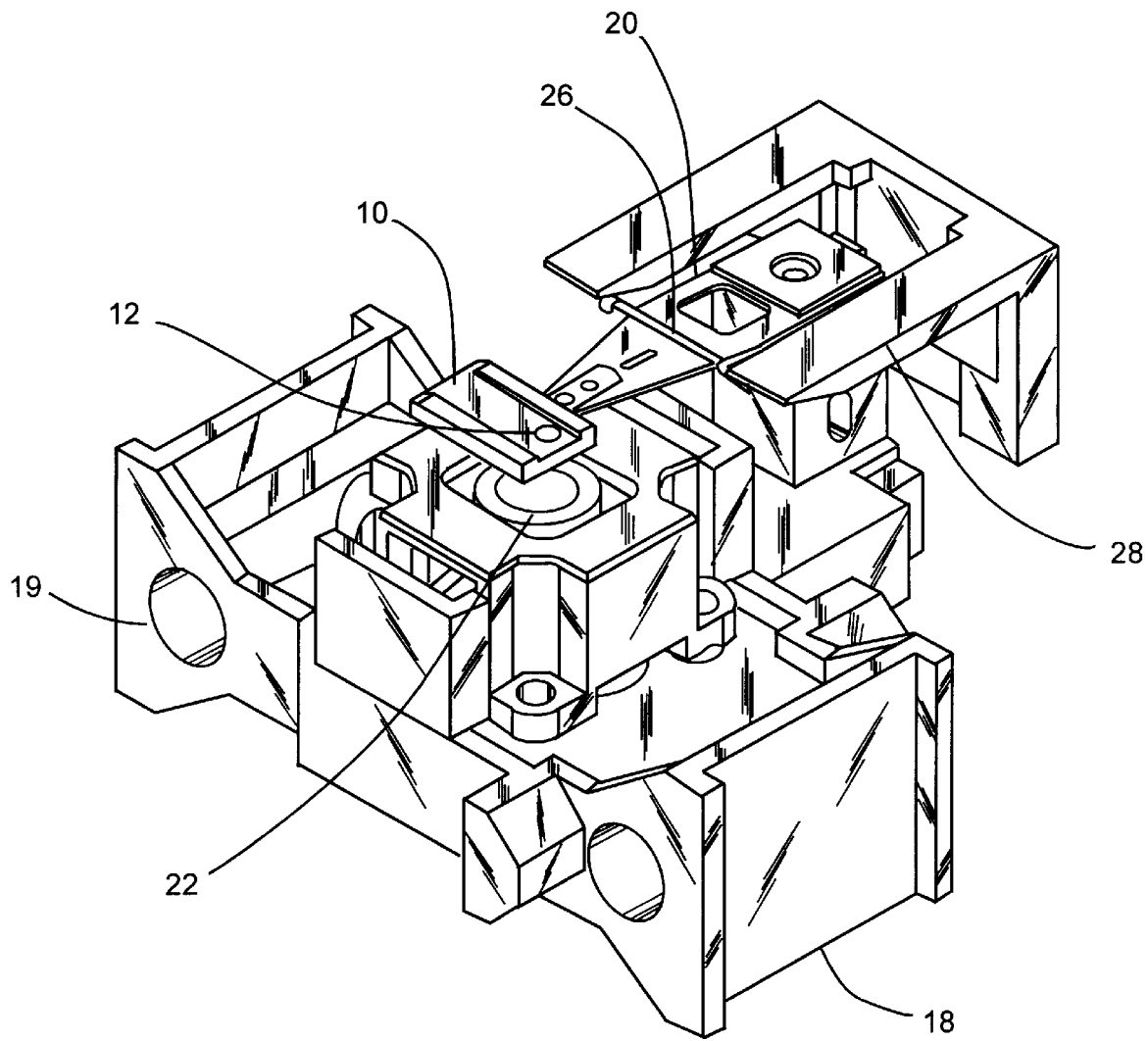
FIG. 2 is an isometric view of components shown in FIG. 1.

The present invention is used in conjunction with a flying lens system for accessing data on a disk. Referring now to FIGS. 1–2, such a system 8 is shown with a flying lens slider 10. In a preferred embodiment the flying lens 12 is part of an air bearing system (ABS) with a flying lens slider 10. The flying lens slider 10 can either contain the flying lens 12, which may be made of a different material, or be of single-piece construction. The disk 14, which is either fixed or removable, rotates about an axis 16 spinning relative to the movable optical module 18. The movable optical module 18 slides perpendicular to axis 16, preferably in a linear manner radially with respect to disk 14 using rail guides 19. Flying lens slider 10 is attached to movable optical module 18 by load beam 20 and slides with it relative to axis 16, as does objective lens 22. With the rotation of disk 14 and the sliding of movable optical module 18, light from light source 24, reflected by mirrors or prisms which are not shown, can pass through both objective lens 22 and flying lens 12 to any point where data is accessed on disk 14.

In a presently preferred embodiment of the present invention, flying lens 12 is positioned at a nearly constant distance from the surface of disk 14 when accessing data. Objective lens 22 may be moved relative to the surface of disk 14 by a device such as an actuator within movable optical module 18. Working cooperatively, objective lens 22 and the flying lens 12 within flying lens slider 10 correct for spherical aberration while focusing the light from light source 24 at various distances from the surface of disk 14.

Flying lens slider 10 functions as an air bearing to maintain a nearly constant distance between it and the surface of disk 14 when the disk is rotating. Load beam 20 biases or preloads flying lens slider 10 towards the surface of disk 14 using a suspension system mechanism such as a leaf spring or a hinge with a torsional spring. Flying lens slider 10 is also subject to an opposing aerodynamic force, pushing it away from the surface of disk 14, caused by the moving air stream from the rotating of disk 14 and the shape of lens slider 10. During normal operations disk 14 rotates at a nearly constant speed causing flying lens slider 10 to maintain an equilibrium position close to the surface of disk 14 where the preload and aerodynamic forces balance.

As the rotation speed of disk 14 decreases the accompanying aerodynamic force also decreases while the preload force of load beam 20 remains constant. The net effect would push lens slider 10 into contact with disk 14 below a certain rotation speed. Contact between lens slider 10 and disk 14 is undesirable and the present invention provides a method and apparatus to avoid this contact. Lens slider 10 may be designed for a constant and preferred disk 14 rotation speed. At this speed lens slider 10 maintains the nearly constant design distance from the surface of disk 14. For speeds below the preferred rotation speed, lens slider 10 and/or the surface of disk 14 may be scratched by the contact. Even if damage could be avoided until disk 14 stops rotating, friction between flying lens slider 10 and the surface of disk 14 during a subsequent start-up may be sufficient to shear flying lens slider 10 from load beam 20.

Figure 3:
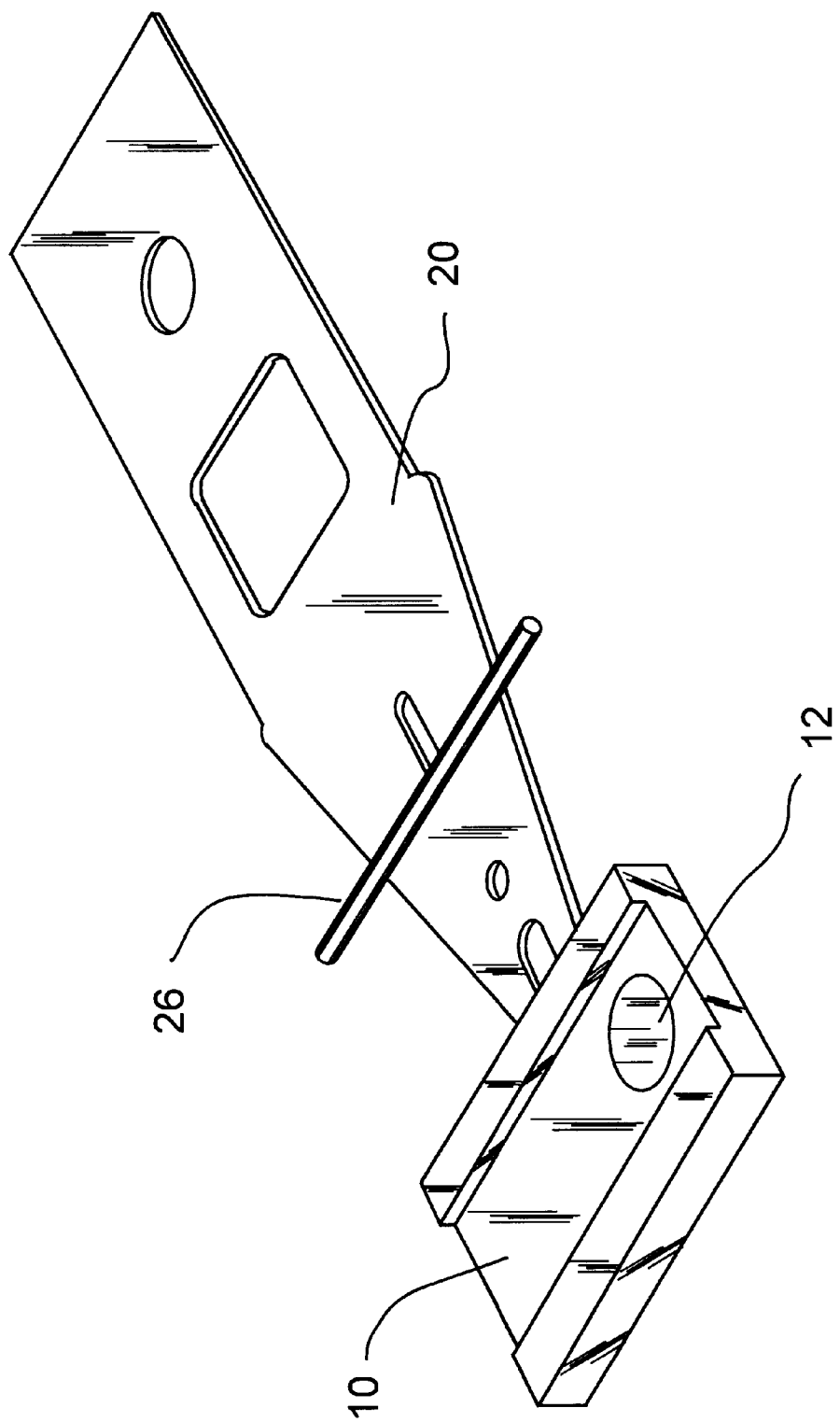
FIG. 3 is an isometric view of a flying lens and attached components.
Figure 4:
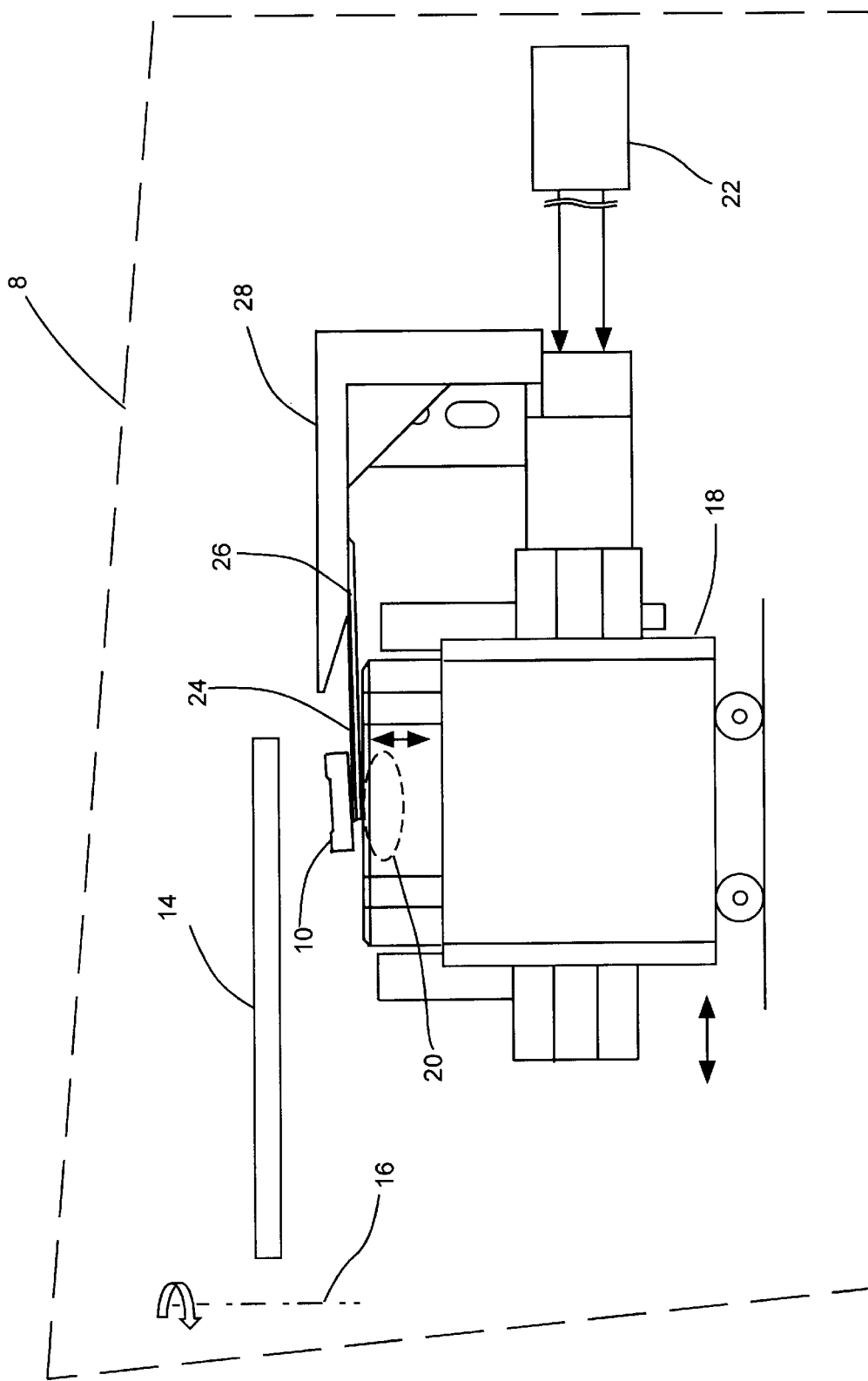
FIG. 4 is an elevation view of an unloaded flying lens optical system.
Figure 5:
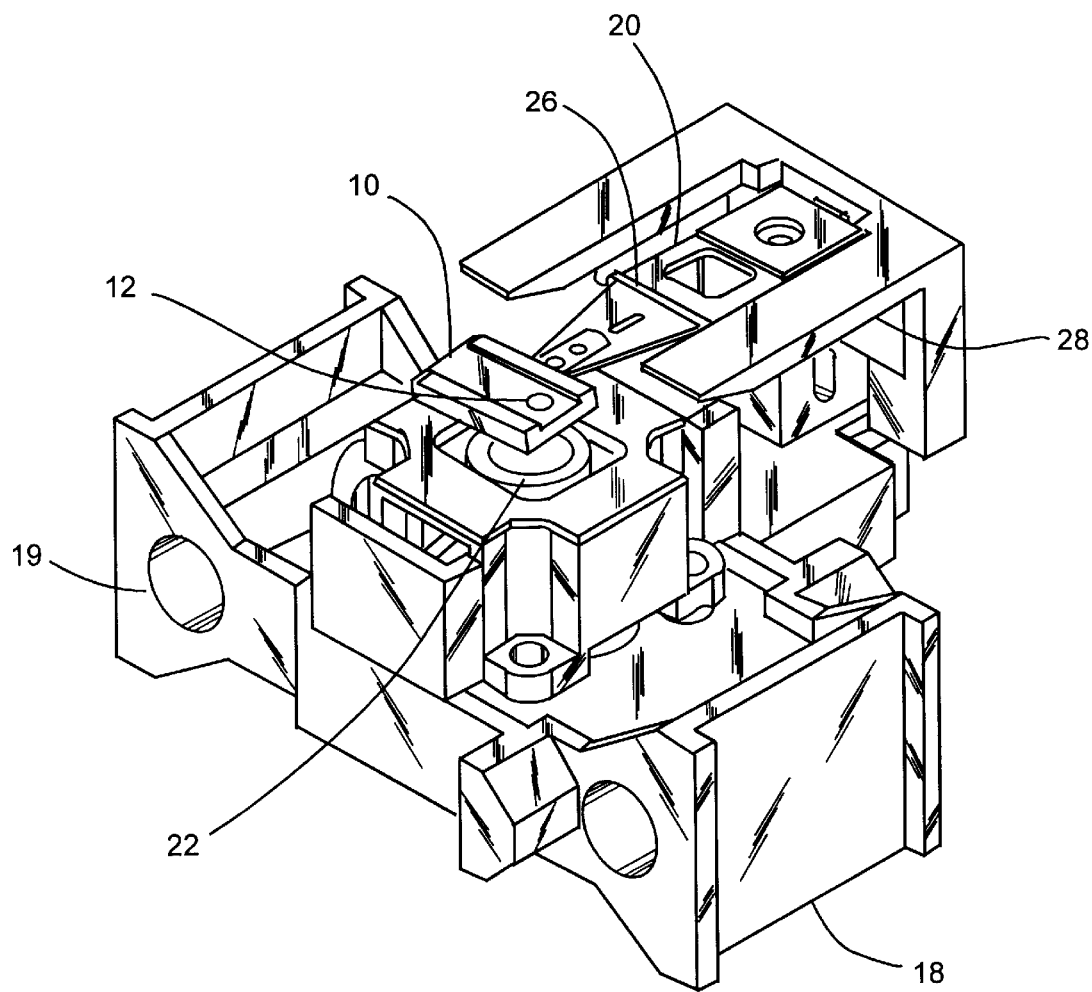
FIG. 5 is an isometric view of components shown in FIG. 4.
Figure 6:
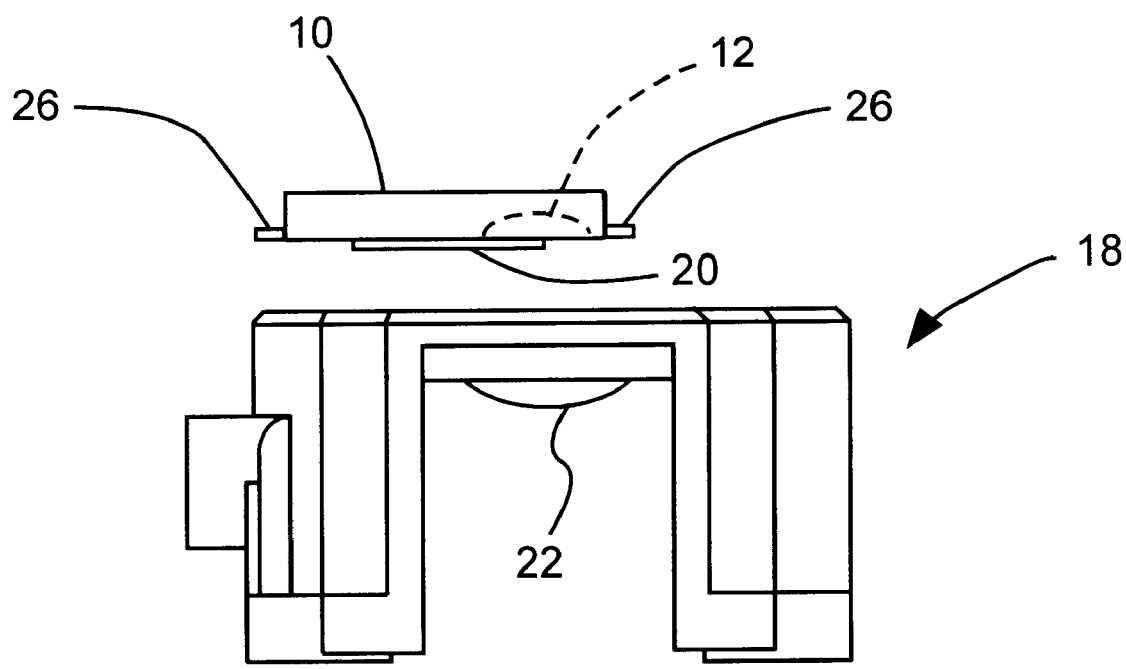
FIG. 6 is a sectional view taken substantially as indicated along the 6—6 line of FIG. 1.

Referring now to FIGS. 3–6, the present invention includes load bar 26 and ramp 28 to bend load beam 20 and remove the preload on flying lens slider 10. Load bar 26 bearing on ramp 28 bends load beam 20 causing flying lens slider 10 to unload flying lens 12 or increase the separation distance between it and the surface of disk 14. The amount of movement in a presently preferred embodiment of the present invention is from about 0.28 mm to about 0.86 mm, although the present invention is not intended to be limited to any particular amount of movement for either the loading or unloading operations. Preferably ramp 28 is stationery in relation to movable optical module 18, and load bar 26 is rigidly attached to load beam 20. Those of ordinary skill in the art will recognize that the geometry of the invention with load bar 26 as shown in FIG. 3 is merely one of many embodiments that can be used to load and unload a flying lens with a ramp, the present invention is not intended to be limited to any particular configuration. Ramp 28 may begin to unload flying lens 12 when the distance of movable optical module 18 from axis 16 is greater than where objective lens 20 and flying lens 12 access data from the outside radius of disk 14. Flying lens 12 is unloaded by the sliding motion of movable optical module 18 as it approaches the end of its operating range away from axis 16 and load bar 26 bears on ramp 28. Loading flying lens 12 is accomplished through motion of movable optical module 18 towards axis 16 so that load bar 26 no longer bears on ramp 28, preferably after disk 14 is rotating at full speed. FIG. 6 shows a sectional view, as indicated by line 6—6 in FIG. 1, with load bar 26 attached to load beam 20. The centerline of flying lens slider 10 is offset from that of the objective lens 22 in this embodiment, although the flying lens 12 is aligned with objective lens 22. This embodiment allows the attachment of load beam 20 at the centerline of flying lens slider 10 in order to evenly apply the preload.

Another embodiment of the present invention is to attach ramp 28 to movable optical module 18 so that ramp 28 slides relative to load bar 26 to load and unload flying lens 12. This sliding could be controlled by an actuator or other such device as known to the art.

Figure 7:
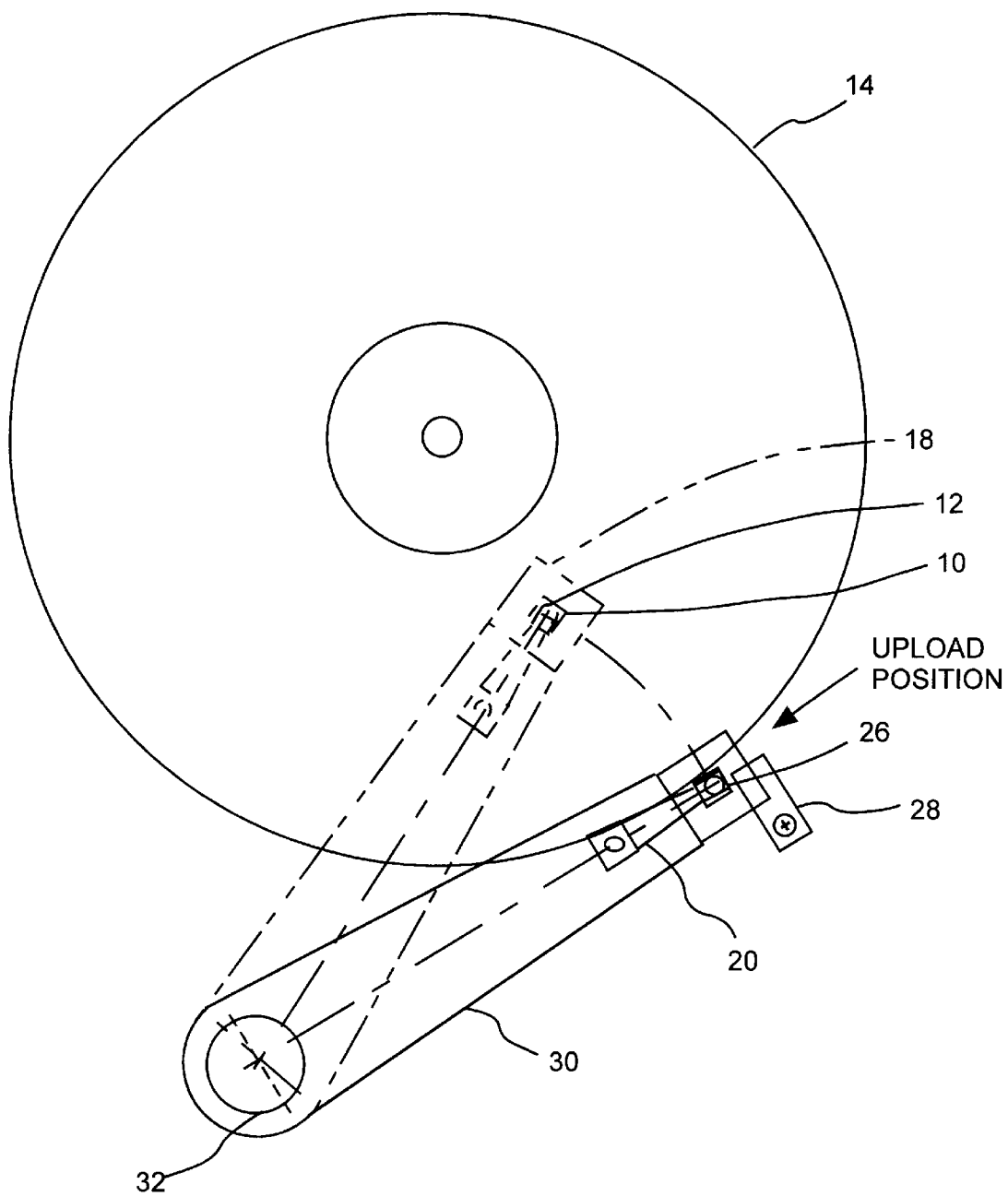
FIG. 7 is a plan view of another embodiment of the present invention.

Referring to FIG. 7, another embodiment of the present invention utilizing a rotating actuator arm 30 is shown. Rotating actuator arm 30 pivots about a rotating actuator pivot center 32. Unlike the embodiments illustrated in FIGS. 1–5, the moving optical module 18 in this embodiment does not move perpendicular to the rotation axis 16 of disk 14. Those of ordinary skill in the art will recognize that ramp 28 shown in FIG. 7 engages flying lens slider 10 perpendicular to load beam 20, thus requiring load bar 26 to be reoriented relative to the embodiment shown in FIGS. 1–5.

Although this disclosure describes loading and unloading a single flying lens on one side of an optical disk, the present invention is not intended to be limited to this embodiment. Those of ordinary skill in the art will recognize that the present invention can also be used for loading and unloading multiple flying lenses sliders in arrays of optical disks as well as on opposite surfaces of a single optical disk.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus for loading and unloading a flying lens relative to the surface of a moving optical storage media, comprising:

a movable optical module;

a flying lens mounted on said movable optical module, optically coupled with said movable optical module to access data on the moving optical storage media; and a ramp for loading and unloading said flying lens by slidably engaging said movable optical module as said movable optical module moves relative to said ramp.

2. An apparatus in accordance with claim 1 wherein said flying lens is part of a flying lens slider.

3. An apparatus in accordance with claim 2 wherein said flying lens slider is connected to said movable optical module by a suspension system to preload said flying lens slider towards the surface of the optical storage media.

4. An apparatus in accordance with claim 3 wherein said suspension system includes a leaf spring.

5. An apparatus in accordance with claim 3 wherein said suspension system is pivotally mounted to said movable optical module.

6. An apparatus in accordance with claim 3 further comprising a load bar attached to said suspension system for engaging said ramp.

7. An apparatus in accordance with claim 2 wherein said flying lens is offset from the centerline of said flying lens slider.

8. An apparatus in accordance with claim 1 wherein said ramp is fixed and engages said movable optical module.

9. An apparatus in accordance with claim 1 wherein said ramp is retractably mounted on said movable optical module.

10. An apparatus in accordance with claim 1 wherein said movable optical module supports an objective lens.

11. An apparatus in accordance with claim 10 further comprising a moving device for moving said objective lens relative to the surface of the optical storage media.

12. An apparatus in accordance with claim 11 wherein a gap exists between said unloaded flying lens and said objective lens for all positions of said objective lens.

13. An apparatus in accordance with claim 1 wherein the moving optical storage media is a rotating disk.

14. An apparatus in accordance with claim 13 wherein the sliding of said movable optical module is linear.

15. An apparatus in accordance with claim 13 wherein said flying lens unloading is performed before stopping said rotating disk.

16. An apparatus in accordance with claim 1 wherein the moving optical storage media is removable.

17. An apparatus in accordance with claim 16 wherein said flying lens unloading is performed before removing the moving optical storage media.

18. An apparatus in accordance with claim 1 wherein said flying lens moves in the range of about 0.28 mm to 0.86 mm relative to the surface of the optical storage media from the loaded and unloaded position.

19. An apparatus in accordance with claim 1 responsive to a minimum speed of the moving optical storage media before loading said flying lens.

20. An apparatus for loading and unloading a plurality of flying lenses relative to a plurality of surfaces of moving optical storage media, comprising:
   one or more movable optical modules;
   a plurality of flying lenses mounted on said one or more movable optical modules to access data on the moving optical storage media; and
   one or more ramps for loading and unloading said flying lenses by slidably engaging said one or more movable optical modules as said one or more movable optical modules move relative to said one or more ramps.

21. An apparatus in accordance with claim 20 wherein said flying lenses are part of flying lens sliders.

22. An apparatus in accordance with claim 21, wherein said flying lens sliders are connected to said one or more optical modules by suspension systems to pre load said flying lens sliders towards the surfaces of the optical storage media.

23. An apparatus in accordance with claim 22 wherein said suspension systems include leaf springs.

24. An apparatus in accordance with claim 22 wherein said suspension systems are pivotally mounted to said one or more movable optical modules.

25. An apparatus in accordance with claim 22 further comprising load bars attached to said suspension systems for engaging said one or more ramps.

26. An apparatus in accordance with claim 21 wherein said flying lenses are offset from the centerline of said flying lens sliders.

27. An apparatus in accordance with claim 20 wherein said one or more ramps are fixed and engage said one or more movable optical modules.

28. An apparatus in accordance with claim 20 wherein said one or more ramps are retractably mounted on said one or more movable optical modules.

29. An apparatus in accordance with claim 20 wherein said one or more movable optical modules support objective lenses.

30. An apparatus in accordance with claim 29 further comprising moving devices for moving said objective lenses relative to the surfaces of the optical storage media.

31. An apparatus in accordance with claim 30 wherein gaps exist between said unloaded flying lenses and said objective lenses for all positions of said objective lenses.

32. An apparatus in accordance with claim 20, wherein the moving optical storage media comprises rotating disks.

33. An apparatus in accordance with claim 32 wherein the sliding of said one or more movable optical modules is linear.

34. An apparatus in accordance with claim 32 wherein said flying lens unloading is performed before stopping said rotating disks.

35. An apparatus in accordance with claim 20 wherein the moving optical storage media is removable.

36. An apparatus in accordance with claim 20 wherein said flying lens unloading is performed before removing the moving optical storage media.

37. An apparatus in accordance with claim 20 responsive to a minimum speed of the moving optical storage media before loading said flying lenses.

38. A method for loading a flying lens relative to the surface of a moving optical storage media, comprising:
   moving the flying lens toward the surface of the moving optical storage media from a parked position; and
   flying the flying lens at a nearly constant distance from the surface of the moving optical storage media.

39. A method in accordance with claim 38 wherein said flying is performed using a flying lens slider.

40. A method in accordance with claim 39 including preloading said flying lens slider.

41. A method in accordance with claim 40 including loading the flying lens by disengaging a load bar.

42. A method in accordance with claim 39 including loading said flying lens slider with the flying lens offset from the center of said flying lens slider.

43. A method in accordance with claim 38 including loading the flying lens by disengaging a fixed ramp.

44. A method in accordance with claim 38 including loading the flying lens by disengaging a retractable ramp.

45. A method in accordance with claim 38 including rotating the moving optical storage media.

46. A method in accordance with claim 38 wherein said loading is performed on removable optical storage media.

47. A method in accordance with claim 38 including moving the flying lens from about 0.28 mm to 0.86 mm relative to the surface of the optical storage media when loading the lens.

48. A method in accordance with claim 38 including waiting for the moving optical storage media to reach a critical speed before loading the flying lens.

49. A method for unloading a flying lens relative to the surface of a moving optical storage media, comprising:
   moving the flying lens away from the surface of the moving optical storage media; and supporting the flying lens in a parked position away from the surface of the media.

50. A method in accordance with claim 49 wherein said moving of the flying lens is performed using a flying lens slider.

51. A method in accordance with claim 50 including preloading said flying lens slider.

52. A method in accordance with claim 50 including unloading said flying lens slider with the flying lens offset from the center of said flying lens slider.

53. A method in accordance with claim 49 including unloading the flying lens by engaging a fixed ramp.

54. A method in accordance with claim 49 including unloading the flying lens by engaging a retractable ramp.

55. A method in accordance with claim 49 including unloading the flying lens by disengaging a load bar.

56. A method in accordance with claim 49 including rotating the moving optical storage media.

57. A method in accordance with claim 49 wherein said unloading is performed on removable optical storage media.

58. A method in accordance with claim 49 including moving the flying lens from about 0.28 mm to 0.86 mm relative to the surface of the optical storage media when unloading the lens.

59. A method in accordance with claim 49 including waiting for the moving optical storage media to reach a critical speed before unloading the flying lens.

60. A method for loading a flying lens relative to the surface of a moving optical storage media, comprising:

moving the flying lens toward the surface of the moving optical storage media;

flying the flying lens at a nearly constant distance from the surface of the moving optical storage media; and coordinating and adjusting the relative distance between the flying lens and an objective lens to correct spherical aberration.

61. An apparatus for loading and unloading a flying lens relative to the surface of a moving optical storage media, comprising:

a rotating actuator arm, pivoting about a rotating actuator pivot center;

a movable optical module mounted on said rotating actuator arm;

a flying lens mounted on said movable optical module, optically coupled with said movable optical module to access data on the moving optical storage media; and a ramp for loading and unloading said flying lens by engaging said movable optical module as said movable optical module moves relative to said ramp.

* * * * *